March 6, 1951 N. E. EARLE ET AL 2,544,303
HOLDING FIXTURE FOR ARTICLES
Filed Nov. 28, 1947 2 Sheets-Sheet 1
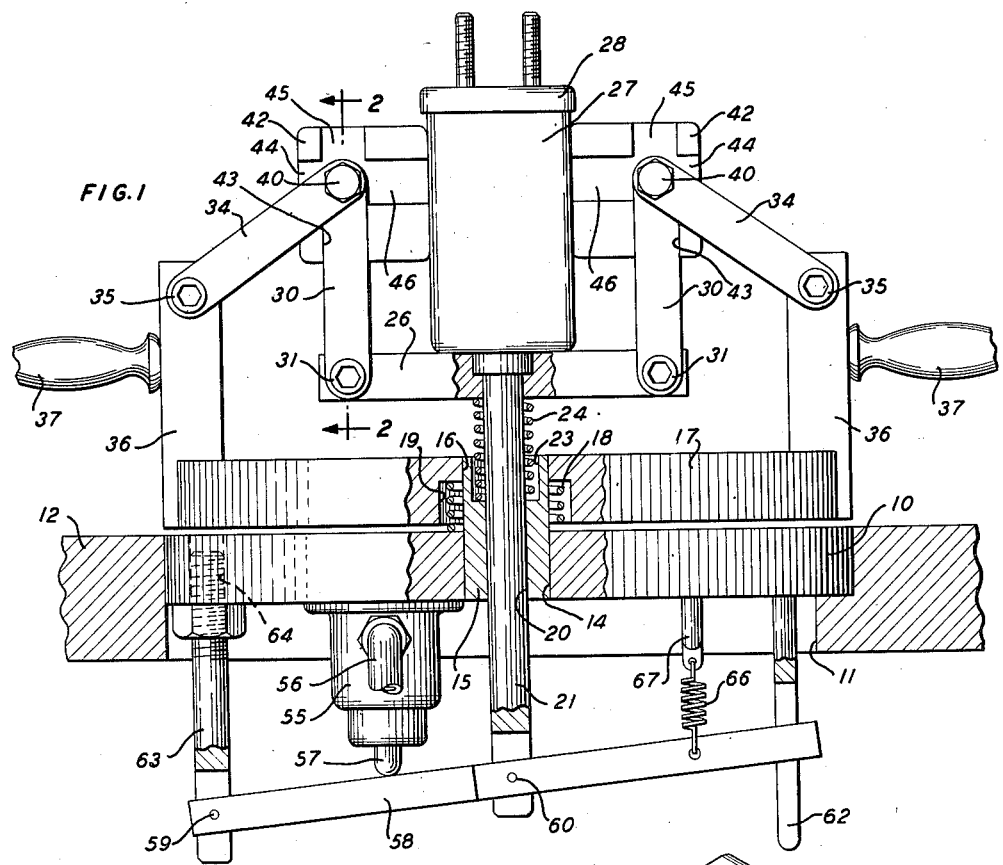
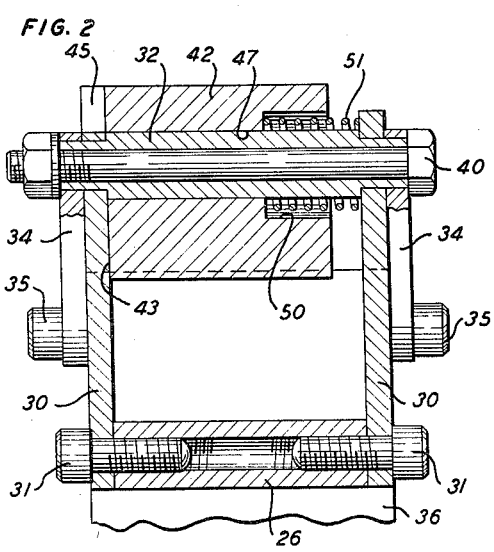
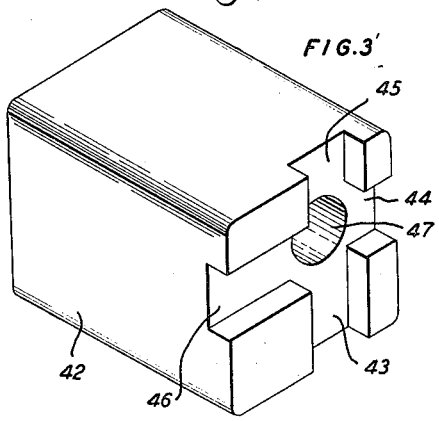
INVENTORS
N. E. EARLE
T. B. ROBINSON
BY
W. C. Parnell
ATTORNEY March 6, 1951  N. E. EARLE ET AL  2,544,303
HOLDING FIXTURE FOR ARTICLES
Filed Nov. 28, 1947  2 Sheets-Sheet 2
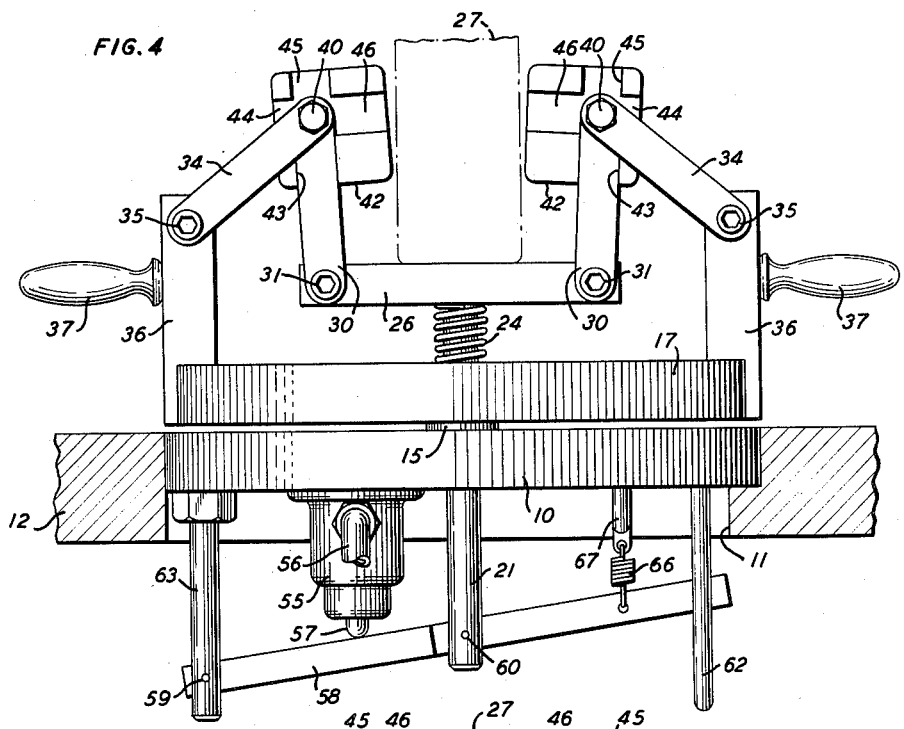
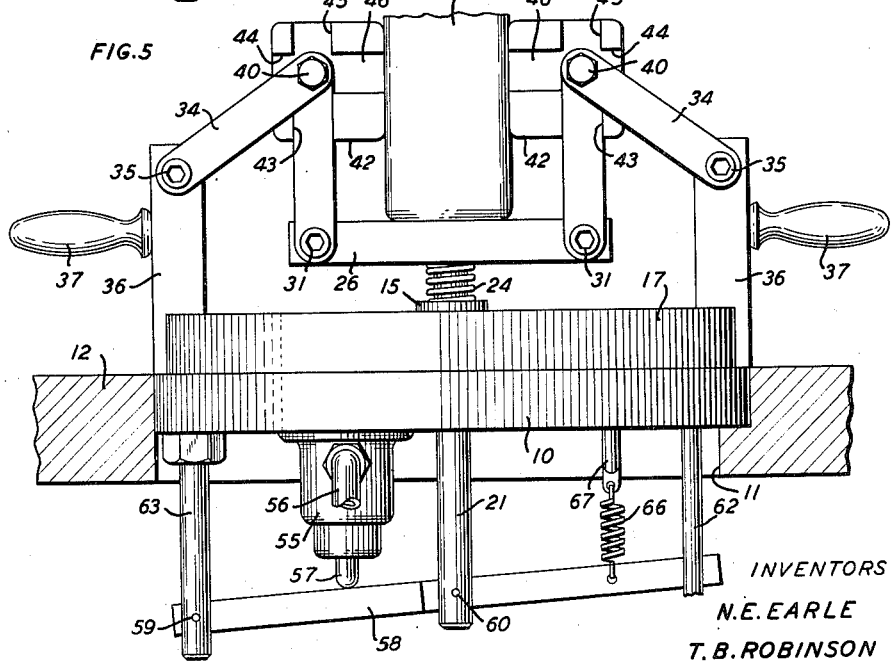
INVENTORS
N. E. EARLE
T. B. ROBINSON
BY W. C. Parnell
ATTORNEY Patented Mar. 6, 1951

2,544,303

UNITED STATES PATENT OFFICE 2,544,303

HOLDING FIXTURE FOR ARTICLES

Norman E. Earle, Groveland, and Theodore B. Robinson, Winchester, Mass., assignors to Western Electric Company, Incorporated, a corporation of New York Application November 28, 1947, Serial No. 788,546

2 Claims. (Cl. 81—17.2)

This invention relates to article holding fixtures, and an object of the invention is to provide a fixture of this type which is simple in construction, readily actuable, and highly variable to firmly hold articles of various sizes in selected positions.

In the manufacture of telephone equipment numerous electrical units are housed in metal containers, some of which are provided with metal covers to be soldered to their containers to complete the units. The containers and their covers vary in size depending upon the sizes of the electrical units to be housed therein. To facilitate the soldering operations it is important that the containers with their covers be firmly held in positions where the soldering operations may be readily performed.

With the above and other objects in view the invention comprises a base, a support movable thereon, a table carried by the support and movable relative thereto, clamping means actuable to clamp an article on the table, and means actuable to move the table to actuate the clamping means and to hold the support against movement relative to the base.

In the present embodiment of the invention the base is mounted at a fixed position in a bench and carries a spring to normally hold the support upwardly therefrom, whereby the support with the table may be rotated about a spindle carried by the base to locate the article in selected positions for soldering. A pull rod carried by the table extends through a spring partially housed in a recess of the spindle and through a central aperture of the spindle where its lower end is connected to an actuating lever. An air cylinder, operated at will, actuates the lever to pull the rod downwardly to actuate the clamping means. The clamping means actuated by downward movement of the table includes blocks having a plurality of grooves extending radially from their pivoted supports to receive supporting links whereby any of the flat surfaces of the blocks disposed varied distances from the pivoted supports may be selected to engage the articles, depending upon the size of the articles to be soldered. After the clamping blocks grip the article, further downward movement of the pull rod will move the table and support downwardly as a unit to hold it against rotation on the base. Compression springs carried by the clamping blocks enable an operator to readily adjust the blocks to locate any of the surfaces thereof in article engaging positions, and to normally urge the blocks in like directions to forcibly hold them in the selected positions.

Other objects and advantages will be apparent from the following detailed description when considered in conjunction with the accompanying drawing wherein Fig. 1 is a front elevational view of the fixture with movable elements thereof disposed intermediate their normal clamping positions, portions thereof being shown in section;

Fig. 2 is an enlarged framentary sectional view taken along the line 2—2 of Fig. 1;

Fig. 3 is an isometric view of one of the clamping blocks, and

Figs. 4 and 5 respectively show front elevational views of the fixture in the normal and clamping positions.

The fixture includes a base 10 mounted in a cutaway portion 11 of a bench 12 or other suitable support. The base 10 is held at a fixed position and is centrally apertured at 14 to receive a spindle 15 held against rotation therein. The spindle 15 extends through a central aperture 16 of a support 17, the support being normally held above the base for rotation about the spindle by a spring 18. The spring 18 is disposed concentric with the spindle 15, supported by the base 10, and partially housed in an annular groove 19 of the support 17. The spindle 15 is centrally apertured at 20 to receive a pull rod 21 and is recessed at 23 at its upper end to receive a spring 24, the spring being positioned concentric with the pull rod and serving to yieldingly support a table 26 in spaced relation to the underlying support 17.

The upper end of the pull rod 21 is swiveled to the table 26 which constitutes the main support for articles, one of which is illustrated at 27. In the present embodiment the containers are provided with covers 28 which are to be soldered to the container. Pairs of links 30 are pivotally connected at their lower ends to the table, as indicated at 31, their upper ends supporting sleeves 32, as illustrated in Fig. 2. The inner ends of companion links 34 are mounted to pivot on the outer ends of the sleeves or spindles 32, the links 34 having their outer ends pivotally connected at 35 to vertical brackets 36, which are mounted at diametrically opposed positions on the support 17. Handles 37 mounted on the brackets 36 may be employed in rotating the upper portion of the fixture, including the support 17 and the table 26, about the spindle 15. The sleeves 32 are provided with bolts 40 to secure the adjacent ends of the links 30 and 34 thereon.

Clamping blocks 42, which are identical in structure with the exception that they may be defined as right and left hand blocks, are mounted for rotation on their sleeves 32. Like ends of the blocks 42 are provided with grooves 43, 44, 45, and 46, extending radially from the apertures 47, through which the sleeves 32 extend, these apertures being essentially disposed in the blocks so that the center lines of the grooves 43 to 46 are located at different distances from the corresponding article engaging surfaces. The opposite ends of the blocks 42 are recessed at 50 to receive compression springs 51 abutting their adjacent levers 30 to normally urge their blocks into locking engagement with one of their links 30 positioned in any selected one of the grooves 43 to 46, inclusive.

The actuating means for the rod 21 includes an air cylinder 55 mounted on the under surface of the base 10 and including a piston (not shown) normally urged upwardly by the conventional spring and urged downwardly by the admission of air under pressure through an air line 56 under the control of a suitable valve (not shown) to force a plunger 57 downwardly, which is carried by the piston. The plunger 57 is positioned to engage a lever 58, having one end pivotally supported at 59, the central portion pivotally connected at 60 to the pull rod 21 and the opposite end guided by a forked member 62. The pivot 59 is supported by an adjustable rod 63 carried by the base 10 and, through its threaded connection 64 with the base, adjustable relative to the base and the air cylinder to vary the movement of the pull rod by the air cylinder to move the table 26 and support 17 downwardly. The springs 24 and 18 are assisted by a spring 66 in moving their respective members, namely, the table 26 and the support 17, upwardly when the air cylinder 55 is held unoperated, the spring 66 being supported by an arm 67 extending downwardly from the base 10 and connected to the lever 58 to normally urge the lever upwardly.

The apparatus as shown in Fig. 1 has started its operation to grip the container or article 27 through the operation of the air cylinder 55. The clamping blocks 42 are normally positioned away from the area in which the article is placed as shown in Fig. 4. The first action following the initial downward movement of the plunger 57 to move the lever 58 downwardly against the force of the spring 24 is to move the table 26 with the article 27 and its cover 28 downwardly, causing rocking movement of the links 34 and their associated links 30 to move the clamping blocks 42 into intimate engagement with the article 27, as shown. During further downward movement of the plunger 57 to rock the lever 58 about its pivot 59 to move the pull rod 21 downwardly, force will be applied to the support 17, through the table 26, the links 30 and 34 and the brackets 36, moving this structure as a unit against the force of the spring 18 into intimate engagement with the base 10 where it is held against rotation during the first soldering operation (see Fig. 5). During this interval of time, the operator may hold the valve for operating the air cylinder 55 open. After the initial soldering operation is completed, the air under pressure to the air cylinder may be released, freeing the various springs 18, 24, and 66 to return the apparatus to its normal position, freeing the support 17 for movement about the spindle 15 to locate the article in another position for soldering. The air cylinder may again be operated to clamp the article between the clamping blocks 42 and to hold the support with the table and article against movement during the final soldering operation.

If an article of a different size is to be supported by the fixture for soldering, the apparatus may be conditioned to receive this article by first determining the size thereof and adjusting the clamping blocks accordingly. This may be done by moving each clamping block laterally on its sleeve 32 against the force of its spring 51 and rotating the clamping block until the selected groove 43, 44, 45, or 46 has been positioned to register with the adjacent link 30. In this manner the various outer surfaces or sides of the clamping blocks 42, which are disposed varied distances from the sleeve, may be moved into article engagement position for varying the distances between the block for clamping articles of various sizes. Furthermore, the locking feature between the notches 43—46 and the links 30 assures positioning of the various surfaces of clamping elements parallel with the article when in article engaging position.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A holding fixture for articles comprising a table to support articles of various sizes singly, spaced arms pivotally mounted on the table, a support, links connecting the arms to the support to movably support the table, spindles carried by the arms, clamping elements having apertures therein disposed varied distances from a plurality of article engaging surfaces of each element whereby the surfaces may be selectively positioned to engage and clamp articles of various sizes singly upon movement of the table, means to normally hold the table in a loading position to hold the clamping elements out of article engaging positions, and means to move the table to move the arms and links to thereby cause movement of the clamping elements into engagement with the article.

2. A holding fixture for articles comprising a table to suport articles of various sizes singly, spaced arms pivotally mounted on the table, a support, links connecting the arms to the support to movably support the table, spindles carried by the arms, clamping elements having apertures therein disposed varied distances from a plurality of article engaging surfaces of each element whereby the surfaces may be selectively positioned to engage and clamp articles of various sizes singly upon movement of the table, means to normally hold the table in a loading position to hold the clamping elements out of article engaging positions, the clamping elements having grooves in like ends thereof extending radially from their respective apertures to removably receive adjacent arms to lock the clamping elements in selected positions to position selected surfaces in article engaging positions, and means to normally hold the clamping elements interlocked with their arms.

NORMAN E. EARLE.
THEODORE B. ROBINSON.

REFERENCES CITED

The following references are of record in the file of this patent:

UNITED STATES PATENTS

| Number | Name | Date |
|---|---|---|
| 9,917 | Green | Aug. 9, 1853 |
| 227,210 | Black | May 4, 1880 |
| 564,543 | Straw | July 21, 1896 |
| 639,944 | Scott | Dec. 26, 1899 |
| 710,482 | Long | Oct. 7, 1902 |
| 1,260,624 | Bardeen | Mar. 26, 1918 |
| 1,261,432 | Parslow | Apr. 2, 1918 |
| 1,436,860 | Church | Nov. 28, 1922 |
| 1,531,377 | Clarke | Mar. 31, 1925 |
| 2,154,038 | Evrell | Apr. 11, 1939 |

FOREIGN PATENTS

| Number | Country | Date |
|---|---|---|
| 8,295 | Norway | May 7, 1900 |